July 3, 1951

W. A. MEISSNER 2,559,311

SETUP GAUGE FOR ADJUSTING TURRET RAM FEED STOP MECHANISM

Filed April 24, 1948

INVENTOR
WALTER A. MEISSNER
BY
Chapin & Neal
ATTORNEYS

July 3, 1951  W. A. MEISSNER  2,559,311
SETUP GAUGE FOR ADJUSTING TURRET
RAM FEED STOP MECHANISM
Filed April 24, 1948  2 Sheets-Sheet 2
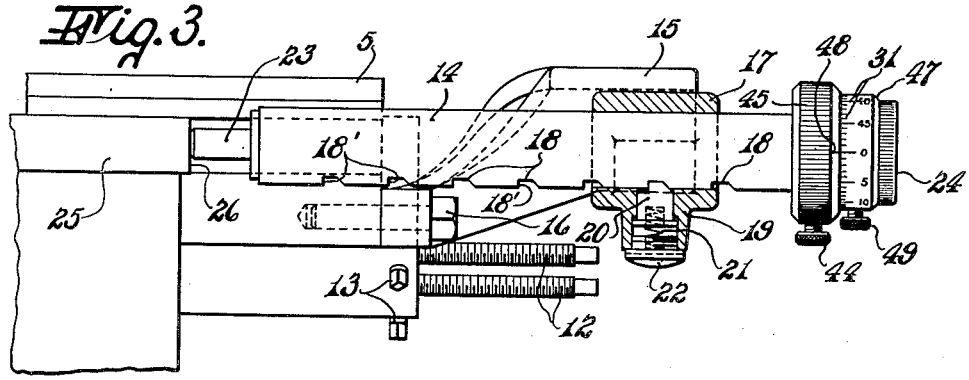
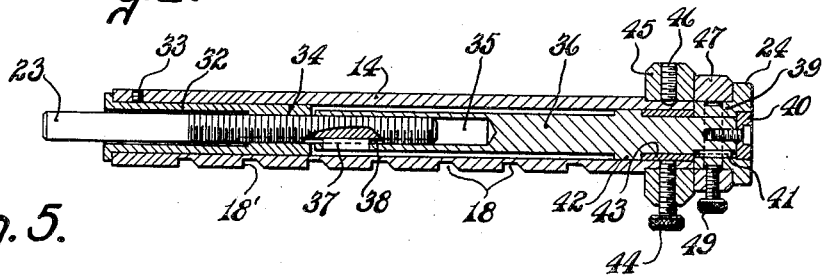
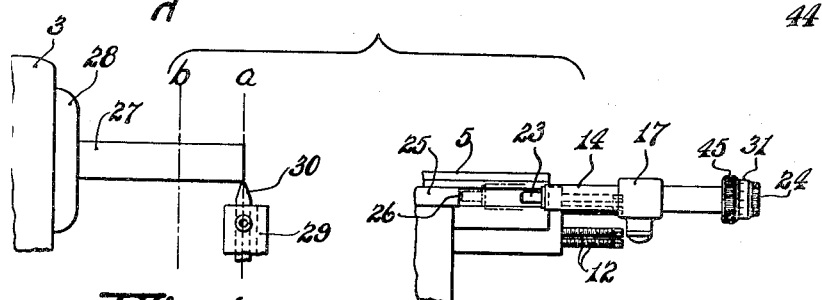
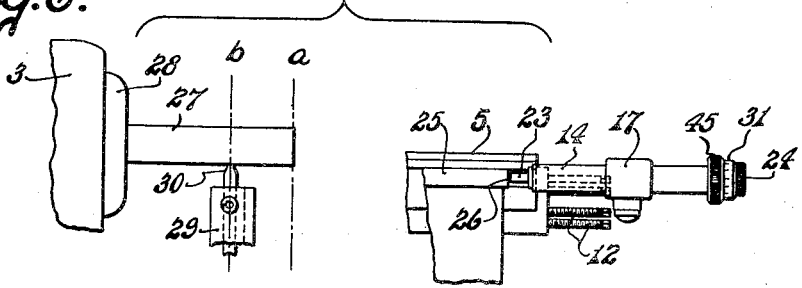
INVENTOR
WALTER A. MEISSNER
BY
Chapin & Neal
ATTORNEYS

Patented July 3, 1951

2,559,311

UNITED STATES PATENT OFFICE 2,559,311

SETUP GAUGE FOR ADJUSTING TURRET RAM FEED STOP MECHANISM

Walter A. Meissner, Feeding Hills, Mass., assignor to Meissner & Landauer, Feeding Hills, Mass., a partnership Application April 24, 1948, Serial No. 23,064

1 Claim. (Cl. 29—65)

This invention relates to a set-up gauge for the ram of a turret lathe and has for an object to provide an easily handled and accurate gauge for indicating the proper depth of ram feed and permitting the quick and precise adjustment of the automatic stop mechanism for the ram feed. Another object is to eliminate trial and error methods commonly used in setting up a machine of this type and ordinarily resulting in production of scrap pieces.

For the purpose of illustrating use of the invention the following description discloses an embodiment of the new apparatus in connection with its use on a "Number Three Universal Turret Lathe" as manufactured by The Warner & Swasey Company of Cleveland, Ohio.

In the drawings,

Fig. 3 is a side elevation of the structure shown by Fig. 2 with parts omitted for clarity;

Fig. 4 is a view on line 4—4 of Fig. 2;

Figs. 5 and 6 are diagrammatic views to show steps in the use of the invention.

Figure 1:
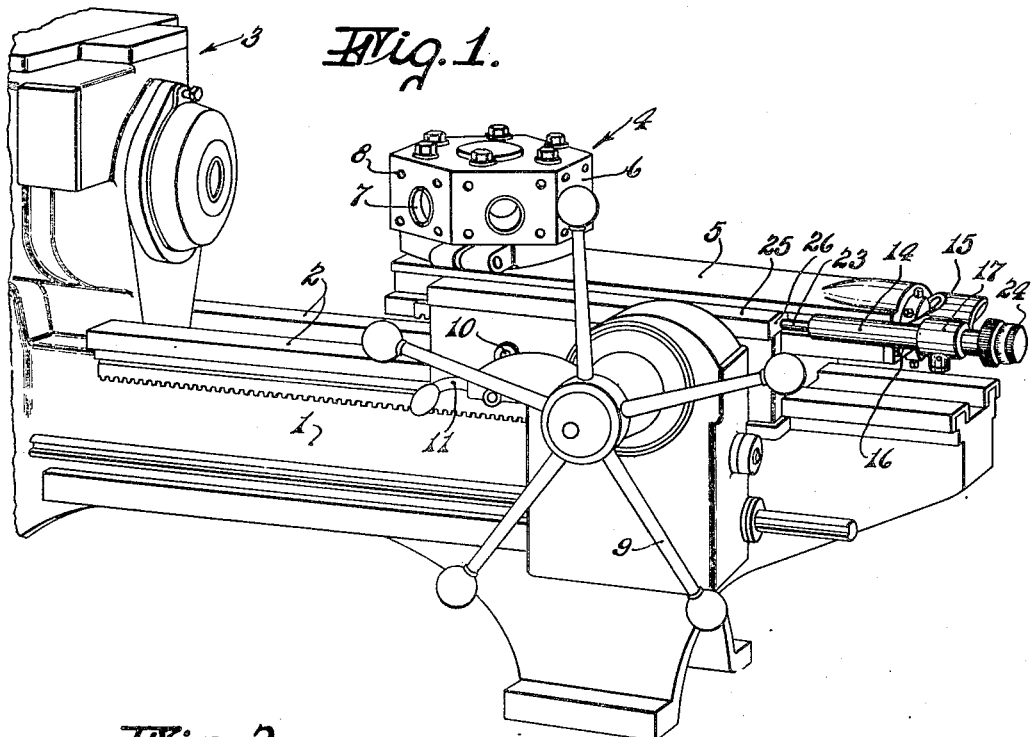
Fig. 1 is a perspective view of a turret lathe with parts omitted showing the gauge in position for use on the ram.

The turret lathe as shown by Fig. 1 with cross slide and other portions omitted for clarity is provided with the usual bed 1, ways 2, headstock 3, turret 4, and turret ram 5. Neither work piece nor tool holders are shown assembled in the machine as no illustration thereof is deemed necessary to an understanding of the present disclosure.

As will be obvious to those familiar with the art the ram 5 is adapted for travel on the ways 2 toward and away from a work piece (not shown) set in the headstock 3. A tool holder (not shown) fixed in a face 6 of the turret, as in a collar 7 or bracketed thereto by means of bolts in fastening holes 8, is indexed in the turret for working on the piece held in the headstock. The ram is then mechanically fed toward the work. In a machine which is set up for operation the ram will automatically stop as soon as a proper depth of cut for the particular tool is made in the work. The ram is then backed away to a rearward position on the ways by the operator turning wheel handles 9. In the rearward position the turret 4 is automatically turned to index the next face 6 toward the work for advancing a tool held in that face.

The automatic stopping of forward ram travel is provided by a recessed stop plunger 10 located in the side of the ram. The plunger operates at a predetermined limit to project from its recess and trip a clutch handle 11. Said handle is thrown into a neutral position which is the position shown by Fig. 1. In geared position the handle 11 is swung vertically to cover the plunger recess.

Figure 2:
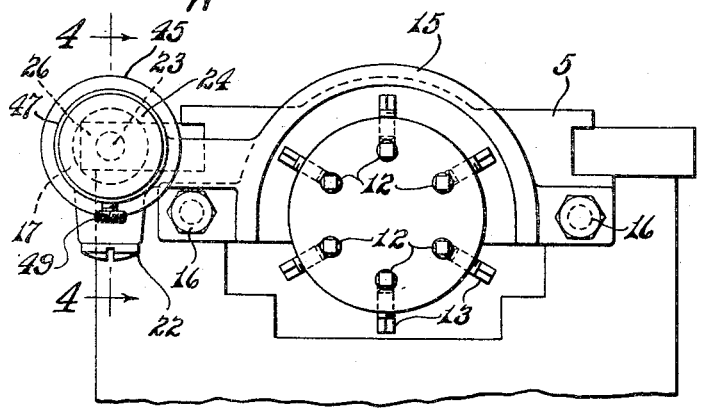
Fig. 2 is an end view of the turret ram of Fig. 1 with the gauge attached.

Stop screws 12 mounted in the butt end of the ram constitute adjustable means to automatically limit the forward ram travel in connection with the turret faces 6. For each face of the turret an individual screw 12 is provided. Each said stop screw may be adjusted to cause the plunger 10 to trip clutch 11 at any limit of travel of the ram when the turret face corresponding thereto is indexed on the ram. As shown by Fig. 2, the stop screws are individually adjustable and locked in position by lock screws 13. As the turret faces 6 are indexed the relative positioning of screws 12 is also changed. The particular stop screw 12 which governs the face indexed in the turret is itself turned to lie in a lowermost or six o'clock position (Fig. 2). By appropriately turning the lowermost screw 12 the forward automatic feed of the ram can be stopped at any given limit. The lowermost screw governs the projection of plunger 10 during forward ram travel and causes said plunger to project and trip the clutch control 11 at a selected position.

This mechanism in the turret lathe and operation thereof as above described is well known to those skilled in the art and readily understood. Briefly, the usual adjustment of the ram for a proper feed depth thereof is accomplished by bringing a tool in the turret to the starting position of a cut to be made in a workpiece, measuring by gauge on the piece the exact linear distance desired, bringing the ram forward for that measured distance, and then turning the appropriate stop screw to cause plunger 10 to trip the clutch. This setting is then checked and adjusted by trial cuts on test pieces until an exact setting has been made for the precision desired.

The structure of my invention is designed to eliminate a trial and error method of this nature.

As shown by Fig. 1 the new apparatus is mounted at the end of the ram with a barrel portion 14 lying parallel with the ways 2 of the bed and along the end portion of the ram. A mounting for the barrel is provided by a bracket 15 in the form of a hooded casting fastened as by bolts 16 to the end of the ram housing (Fig. 2). As will become apparent, the barrel 14 is slidably fitted in the mounting as in a collar 17 integral with bracket 15 and offset therefrom. The barrel can be withdrawn to a rearward position in the collar 17 to accommodate the extreme forward position of the ram, or it may be withdrawn entirely from the bracket as will be described.

Barrel 14 is provided with notches 18 cut in its under surface, the forward walls 18' thereof forming abutments which are spaced precisely one inch apart. As shown by Fig. 3, a socket 19 of collar 17 contains a toothed plunger 20, a spring 21, and a cap screw 22 to form a spring pressed latch means for the locking of the barrel 14 in any of the relative longitudinal positions defined by notches 18. To shift the gauge longitudinally in collar 17 barrel 14 is turned so that plunger 20 rides on its cylindrical surface and is then moved forwardly or rearwardly to the approximate position desired. The barrel is then turned back for insertion of the plunger 20 into the nearest notch. The relative longitudinal shift is, of course, accurately measurable in inches as the notches are precisely dimensioned.

Longitudinal adjustment for dimensions of less than one inch are provided by a micrometer arrangement. A spindle 23 coaxially engaged in the barrel is movable longitudinally therein by a thimble 24 through mechanism to be later described in connection with Fig. 4.

In manipulating the linear measuring device of the apparatus and for setting the adjusting means of the turret ram for automatic operation it is to be noted from Figs. 1 and 3 that the end of spindle 23 is adapted for touching contact with the ram hold down gib structure 25 at the rear edge thereof as at 26. In Figs. 5 and 6 steps in the set-up process are illustrated to clarify the manner of setting up the machine with the device.

As shown by Fig. 5 a work piece indicated by numeral 27 is fixed in the nose piece 28 of the headstock 3. A tool holder 29 with tool bit 30, has been brought by manually advancing the ram to a position at the start of the work. The ram is locked on the ways in this position by a usual lever (not shown) provided for that purpose. The depth of the cut is known to the operator. On the drawing it is indicated as the distance between lines $a$ and $b$.

When the ram and tool are advanced to the start of the cut as shown by Fig. 5, barrel 14 is moved in collar 17 so as to bring its front end adjacent edge 26 of gib 25. The barrel is then notched by plunger 20 and the spindle 23 is projected to contact edge 26. This position of the barrel and spindle is shown by the dotted lines of Fig. 5. Since the depth of cut is a known dimension as might be represented by distance $a$ to $b$, the operator backs off spindle 23 exactly the known distance. This is accomplished by changing the position of the barrel to register plunger 20 in another notch 18, if necessary, and by withdrawing the spindle 23 into the barrel. It will be noted that the thimble 24 is associated with a marked scale 31, as will be described, so that a precisely measured withdrawal of the spindle tip can be made.

When the tip of spindle 23 has been positioned to the rear precisely the distance required for the depth of cut the ram is unlocked and advanced on the ways 2. As will be apparent the device is carried with the ram to approach the fixed position of the edge 26 of the stationary hold down structure. When spindle 23 contacts edge 26, the ram has advanced the proper depth for the cut. This position is shown by Fig. 6. The tool bit 30 is at the position indicated by line $b$; the ram is forward the required distance with relation to the hold down structure 25.

In the position of Fig. 6, the ram is again locked by the operator and the lowermost stop screw 12 is turned until observation determines that plunger 10 will emerge to trip clutch handle 11. The adjusted stop screw 12 is locked in position by lock screw 13. The ram feed stop mechanism is thus set for the particular tool in the indexed turret face. In operation the ram will be carried forward the required depth of cut for that tool and automatically stop when the proper depth of cut is made.

The same manipulation of the gauge is repeated for each of the tools in the turret. When all of the stop screws 12 are properly adjusted the machine is ready for normal operation and automatic forward feed of the ram for each tool in the turret. The gauge, if desired, may be entirely removed from the bracket 15 until needed for another adjustment of the lathe.

The mechanism of the measuring device is shown by Fig. 4. Spindle 23 is threaded in a sleeve 32 set in the end of the barrel and fixed therein as by a set screw 33. The threaded engagement of the sleeve 32 with the spindle is indicated as at 34. The inner end of the spindle is slidably fitted in a bore 35 of a rotatable shaft 36. Said shaft 36 adjacent the outer bored end thereof is provided with a key 37 adapted to ride in a keyway 38 cut in the spindle. Shaft 36 is rotated by thimble 24 shown with a cap portion 39 and held on shaft 36 by cap screw and washer assembly 40. The thimble turns shaft 36 by a key connection 41 with portion 39.

Shaft 36 is journaled in barrel 14 by an offset bearing portion 42 and a bushing 43 fitted tightly in barrel 14. Bushing 43 is held locked with relation to the barrel by a clamp screw 44 set in a knurled hub 45. A set screw 46 assists in locking the hub 45 to the barrel.

Between hub 45 and thimble 24 is a scale ring 47 with indicia as shown at 31 in Fig. 3. Ring 47 is scaled for one thousandth of an inch, there being fifty equally spaced reference lines on the periphery of the ring. The threading of spindle 23 as will be easily understood is cut for twenty turns per inch. A reference line 48 is provided on hub 45 for convenience in indexing the ring to zero, said ring being rotatable with the thimble by means of a set screw 49.

Having disclosed my invention, I claim:

In a turret lathe having a ram and a turret with tool holder faces for automatic and successive indexing on reciprocation of said ram, with adjustable stop elements at the back of the ram for determining the forward limit of ram travel for each position of the turret, and stationary ram hold down structure to guide said ram; a micrometer gauge device and mounting bracket therefore comprising a mounting hood for attachment to the movable ram at the rear thereof, a cylindrical bearing collar on the bracket with the axis of the bearing opening parallel with the path of said ram and offset in line with a rear edge of said hold down structure, a spring pressed latch lock in the collar with a plunger projecting in the bearing opening, a micrometer gauge barrel housing removably set in said bearing and provided with aligned spaced notches at fixed positions along its surface to receive said plunger, a micrometer spindle coaxially engaged in said barrel and extendable beyond the forward end thereof, a sleeve in the barrel encasing said spindle and having a threaded connection therewith, a rotatable thimble with a shaft in the rearward portion of the barrel with the fore end of said shaft having a coaxial bore receiving the inner threaded end of said spindle, a key fixed in the bore of said shaft, and a longitudinal keyway cut in said spindle to receive said key for relative longitudinal movement of said spindle when said thimble rotates said shaft, said thimble having indicia for indicating the linear distance of travel of said spindle beyond the mouth of said sleeve.

WALTER A. MEISSNER.

REFERENCES CITED

The following references are of record in the file of this patent:

UNITED STATES PATENTS

| Number | Name | Date |
|---|---|---|
| 1,853,134 | Mischker | Apr. 12, 1932 |

FOREIGN PATENTS

| Number | Country | Date |
|---|---|---|
| 854,941 | France | Jan. 29, 1940 |